UNITED STATES PATENT OFFICE.

McKENZIE ARNN, OF BRISTOL, VIRGINIA.

WOOD-PRESERVING COMPOUND.

SPECIFICATION forming part of Letters Patent No. 633,778, dated September 26, 1899.

Application filed January 9, 1899. Serial No. 701,681. (No specimens.)

*To all whom it may concern:*

Be it known that I, McKENZIE ARNN, a citizen of the United States, residing at Bristol, in the county of Washington and State of Virginia, have invented certain new and useful Improvements in Compositions for Preserving Wood, &c.; and I do hereby declare the following to be a full, clear, and exact description of the invention, such as will enable others skilled in the art to which it appertains to make and use the same.

The object of my invention is to provide suitable means for treating or acting upon certain materials, either manufactured or in the raw state, which will result in imparting thereto a condition which will render the matter treated less susceptible to the process of decay or deterioration than would be the case if not so treated. My process, therefore, may be said to be a preserving treatment of materials which adds life or lasting capacity to the subject-matter acted upon and also imparts to such matter a more lively condition or state—as, for instance, when applied to straw goods of all classes the object so treated will have a much longer life or possess greater power of resisting deterioration, due to use or misuse.

While I will not attempt to enumerate all of the various applications which may be made of my process, it will be understood that the following will be sufficient to readily determine the broad scope of such application—as, for instance, the process of treatment may be applied to all classes of lumber, timber, whether in a green or seasoned state, willow and split goods, lamp-wicks, cordage, including ropes and sewing-thread, tent goods, wagon-sheets, horse-blankets, shingle roofs, and will increase the wear-resisting capacity of floors, carpets, straw matting, &c. It may also be used for cleansing the paper while upon the wall or before being so disposed, and hundreds of other uses might be mentioned to which my invention may be applied.

My invention may therefore be said to consist in providing a compound which will possess the virtues above enumerated and which may be readily applied to use while in a liquid state, the compound being formulated as follows, to wit: five pounds alum, two pounds soda dissolved in five gallons vinegar, ten pounds salt, ten pounds lime, one pound concentrated lye dissolved in five gallons water either hard or soft, one pound saltpeter, one pound borax, one pound tallow melted in five gallons of warm water. After the above stands for two hours add one pound lump starch to the latter, mixing all three of the three last-mentioned ingredients together, stirring briskly. After standing twenty-four hours a skum will gather at the top, producing a substance like mother in vinegar. Then add one gallon of cornmeal. This will produce a fermentation and cause a seed to form in the bottom like California beer and will increase rapidly, which will reduce the cost of chemicals about twenty per cent.

While the foregoing formula represents the preferred proportion of the ingredients mentioned and the method of combining the same, it will be understood that the substantial equivalent is comprehended by me, and believing that the advantages and use of my invention, as aforesaid, may have been made fully apparent from the foregoing specification further reference thereto is deemed unnecessary.

The subject-matter, as wood, willow, and split goods, cordage, and other individual objects above enumerated, may be conveniently and readily treated by placing the same in a vat or other receptacle and covering said objects with my liquid preserving compound, as above described, while shingle roofs and other similar objects may be treated with my preserving compound by applying the same directly to the surface or surfaces of said objects, as with brush, swab, or other convenient means, it being understood that the main object is to thoroughly saturate the object treated or cover the exposed surfaces thereof with my preserving liquid compound.

Having thus fully described my invention, what I claim as new, and desire to secure by Letters Patent, is—

The herein-described preserving compound for treating timber, straw goods, or the like consisting of five pounds of alum; two pounds soda dissolved in five gallons of vinegar; ten pounds salt; ten pounds lime; one pound concentrated lye dissolved in five gallons water; one pound saltpeter; one pound borax; one pound tallow melted in five gallons of warm water, to which, after standing for two hours, there is added one pound of lump starch, substantially as specified and for the purpose set forth.

In testimony whereof I affix my signature in presence of two witnesses.

McKENZIE ARNN.

Witnesses:
L. E. SPAULDING,
H. J. MINICK.